(12) United States Patent
Jaffari

(10) Patent No.: US 9,512,945 B2
(45) Date of Patent: Dec. 6, 2016

(54) NON-METALLIC EXPANSION/DEFLECTION COUPLING MODULES

(71) Applicant: Andy Ali Jaffari, Bartlett, TN (US)

(72) Inventor: Andy Ali Jaffari, Bartlett, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 13/964,639

(22) Filed: Aug. 12, 2013

(65) Prior Publication Data

US 2013/0341911 A1    Dec. 26, 2013

Related U.S. Application Data

(62) Division of application No. 13/462,456, filed on May 2, 2012.

(60) Provisional application No. 61/482,497, filed on May 4, 2011.

(51) Int. Cl.

| | |
|---|---|
| *F16L 27/10* | (2006.01) |
| *F16L 27/08* | (2006.01) |
| *F16L 27/02* | (2006.01) |
| *F16L 47/18* | (2006.01) |
| *F16L 51/02* | (2006.01) |
| *F16L 27/00* | (2006.01) |

(52) U.S. Cl.
CPC ............ *F16L 27/0849* (2013.01); *F16L 27/00* (2013.01); *F16L 27/026* (2013.01); *F16L 47/18* (2013.01); *F16L 51/025* (2013.01)

(58) Field of Classification Search
USPC .......................... 285/224, 237, 235, 236, 223
See application file for complete search history.

(56) References Cited

U.S. PATENT DOCUMENTS

| | | | |
|---|---|---|---|
| 137,717 A | 4/1873 | Prosser et al. | |
| 203,611 A | 5/1878 | Graydon | |
| 508,006 A | 11/1893 | Filstrup | |
| 1,071,957 A | 9/1913 | Rawson | |
| 1,451,800 A | 4/1923 | Agner | |
| 1,500,921 A | 7/1924 | Bramson et al. | |
| 1,528,967 A | 3/1925 | Bersted | |
| 2,381,426 A | 8/1945 | Allen et al. | |
| 2,890,067 A | 6/1959 | Morin | |
| 3,433,504 A | 3/1969 | Hanes | |
| 4,109,097 A * | 8/1978 | Berry | ............................ 285/235 |
| 4,739,801 A | 4/1988 | Kimura et al. | |
| 4,842,059 A | 6/1989 | Tomek | |
| 4,946,202 A | 8/1990 | Perricone | |

(Continued)

FOREIGN PATENT DOCUMENTS

| | | |
|---|---|---|
| CA | 2150317 C | 11/1995 |
| CA | 2238725 C | 6/1997 |

(Continued)

OTHER PUBLICATIONS

Shorter Oxford English Dictionary on Historical Principles, Fifth edition, 2002, p. 2955, vol. 2—N-Z, Oxford Jniversity Press, Inc, United States.

*Primary Examiner* — Aaron Dunwoody
(74) *Attorney, Agent, or Firm* — Butler Snow LLP

(57) ABSTRACT

An improved device for coupling rigid non-metallic conduits is disclosed. The claimed device is capable of allowing movement in an axial direction due to expansion and contraction and can also compensate for angular or parallel deflection of the conduits.

12 Claims, 4 Drawing Sheets

(56) References Cited

U.S. PATENT DOCUMENTS

| | | | |
|---|---|---|---|
| 5,046,764 | A | 9/1991 | Kimura et al. |
| 5,197,767 | A | 3/1993 | Kimura et al. |
| 5,215,338 | A | 6/1993 | Kimura et al. |
| 6,734,360 | B2 | 5/2004 | Magno |
| 7,644,957 | B2 | 1/2010 | Magno, Jr. et al. |

FOREIGN PATENT DOCUMENTS

| | | | |
|---|---|---|---|
| CA | 2176855 | C | 9/1997 |
| CA | 2282829 | C | 9/1998 |
| CA | 2282039 | C | 2/2001 |
| CA | 2346234 | C | 11/2001 |
| CA | 2403747 | C | 8/2002 |
| CA | 2390785 | C | 12/2002 |
| CA | 2434708 | C | 12/2002 |
| CA | 2438008 | A1 | 2/2004 |
| CA | 2530260 | C | 6/2006 |
| CA | 110100 | S | 3/2007 |
| CA | 119581 | S | 3/2007 |
| CA | 119582 | S | 3/2007 |
| CA | 119583 | S | 3/2007 |
| CA | 121646 | S | 4/2008 |
| CA | 2675571 | A1 | 8/2008 |
| CA | 2630325 | A1 | 11/2008 |
| CA | 2657170 | A1 | 9/2009 |
| CA | 2639679 | A1 | 3/2010 |

* cited by examiner

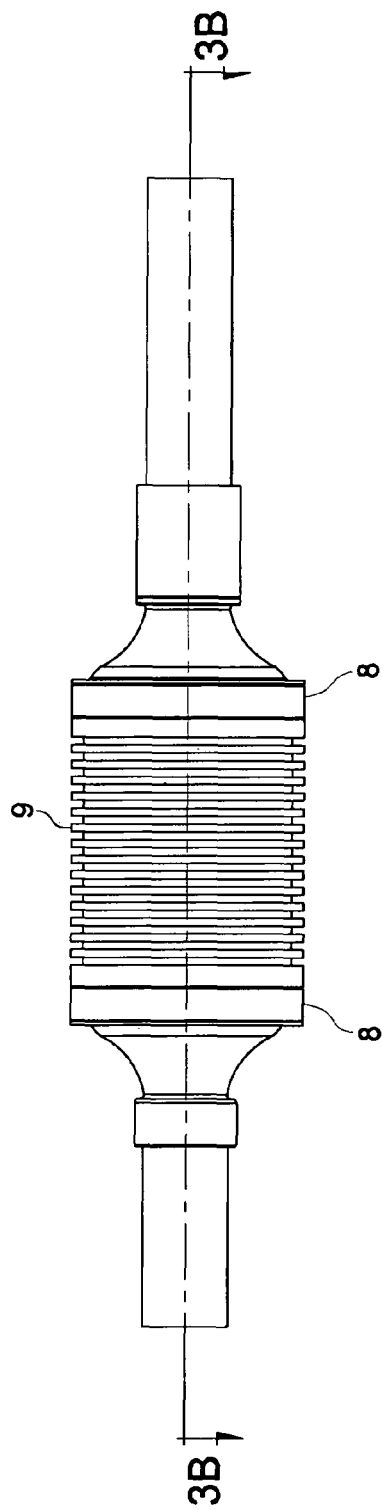
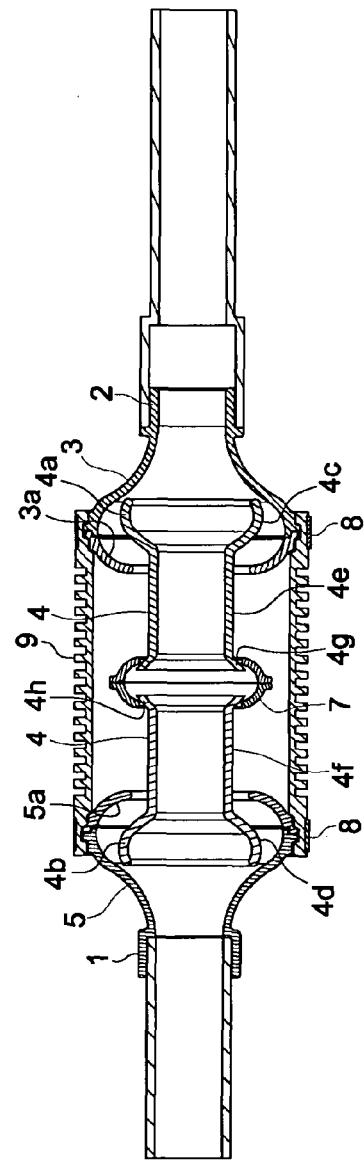
FIG. 3A
FIG. 3B

NON-METALLIC EXPANSION/DEFLECTION COUPLING MODULES

CROSS-REFERENCES TO RELATED APPLICATIONS

This application is a divisional of U.S. patent application Ser. No. 13/462,456, filed on May 2, 2012, which claims priority to U.S. Provisional Application No. 61/482,497 filed May 4, 2011, both of which are incorporated herein by reference in entirety. This application is also related to co-pending divisional U.S. patent application Ser. No. 13/964,667, filed concurrently with this application on Aug. 12, 2013.

FIELD OF THE INVENTION

The present invention is generally directed toward a device for joining electrical conduits. More specifically, it is directed toward an expansion and deflection coupling that allows a greater range of movement of the conduits relative to each other.

BACKGROUND OF THE INVENTION

When joining two pieces of electrical conduit together, a simple straight coupling is sufficient if the conduits are in axial alignment, and a rigid connection is acceptable. However, at junctions where the two conduits do not line up perfectly, such as in instances of axial misalignment or parallel misalignment, angled couplings are required to join the conduit together.

Certain installations further require that the coupling be flexible in order to accommodate movement. For example, a flexible conduit may be required where a raceway crosses a structural joint intended for expansion, contraction or deflection, such as in buildings, bridges, parking garages, or across adjacent sections of pavement. Conduit couplings that are installed in these locations need to be able to flex in order to accommodate the movement due to changes in temperature and the weight of vehicles. Currently available couplings have limited ability to adjust for axial expansion and contraction movements. Furthermore, prior known expansion and deflection couplings do not offer an increase in movements when being installed on site. If a greater range of movement is desired, the device has to be custom designed for this at the factory.

The presently disclosed conduit couplings are able to provide a wider range of axial and angular movement than was previously available.

SUMMARY OF THE INVENTION

A new coupling device that allows greater range of motion is disclosed. The coupling device can accommodate axial expansion and contraction, as well as angular and parallel deflection. The claimed device is also capable of angular movements while expanding/contracting without resulting in a decreased inner diameter. The claimed device is constructed in a modular fashion such that additional couplings can be added to further increase the range of motion.

BRIEF DESCRIPTION OF THE DRAWINGS

Further advantages of the invention will become apparent by reference to the detailed description of preferred embodiments when considered in conjunction with the drawings:

FIG. 3A depicts the claimed device with a boot surrounding the joints.

FIG. 3B is a cross sectional view of the claimed device as viewed along line 3B-3B of FIG. 3A.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1:
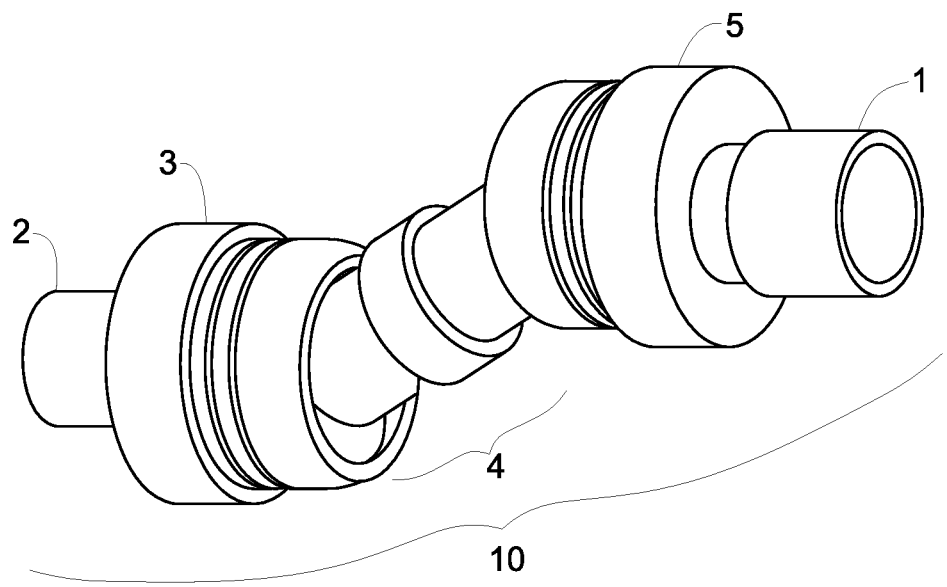
FIG. 1 depicts a perspective view of the claimed device in an angled formation with a rigid center joint.

Referring to the drawings, FIG. 1 illustrates one embodiment of the invention. The device consists of a male end 2 and a coupling end 1. The male end 2 is configured such that it can be inserted into the standard bell-end of a rigid non-metal conduit. At the opposite end of the device, coupling end 1 is configured to receive the male end 2 of a rigid non-metallic conduit. The coupling end 1 may be secured to the rigid non-metallic conduit through the use of adhesive, such as PVC cement.

Figure 2:
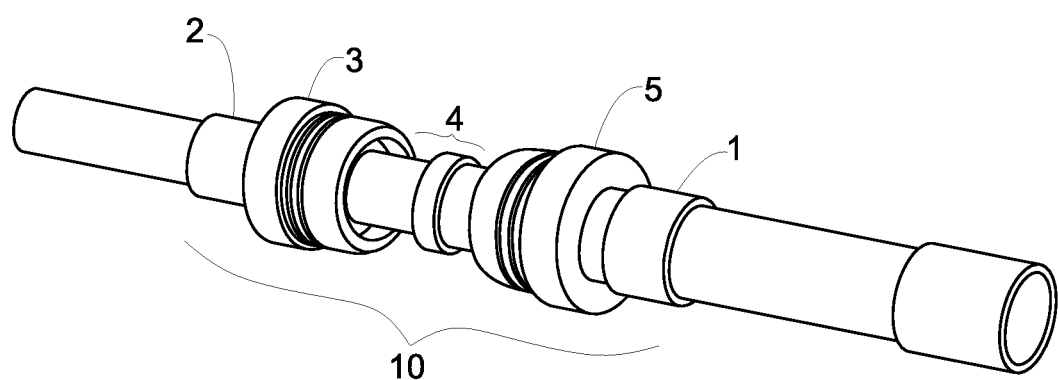
FIG. 2 depicts a perspective view of the claimed device in a linear formation.

FIG. 2 illustrates the embodiment of the invention shown in FIGS. 1 and 4 in a non-deflection position. The device consists of a male end 2 and a coupling end 1. As can be appreciated in FIG. 2, the male end 2 is configured such that it can be inserted into the standard bell-end of a rigid non-metal conduit. FIG. 2 depicts the device's male end 2 inserted into the standard bell-end of a rigid non-metal conduit (not labeled). As can be appreciated in FIG. 2, the coupling end 1 is configured to receive the male end of a rigid non-metallic conduit. FIG. 2 depicts the device's coupling end 1 receiving the male end of a rigid non-metallic conduit (not labeled). The ends 1,2 may be secured to the rigid non-metallic conduit through the use of adhesive, such as PVC cement.

Figure 4A:
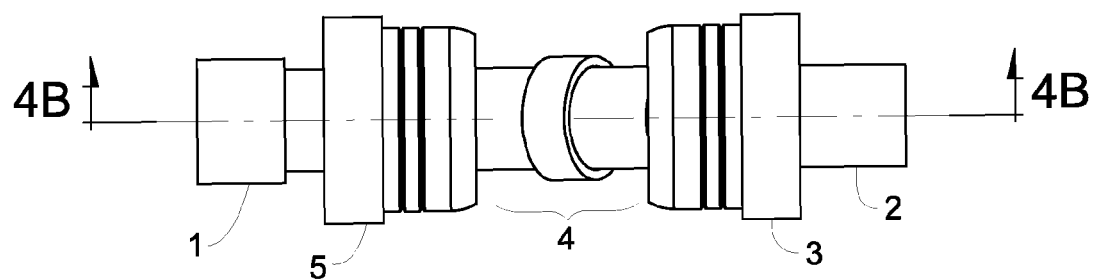
FIG. 4A depicts an elevation view of the claimed device without an outer jacket.
Figure 4B:
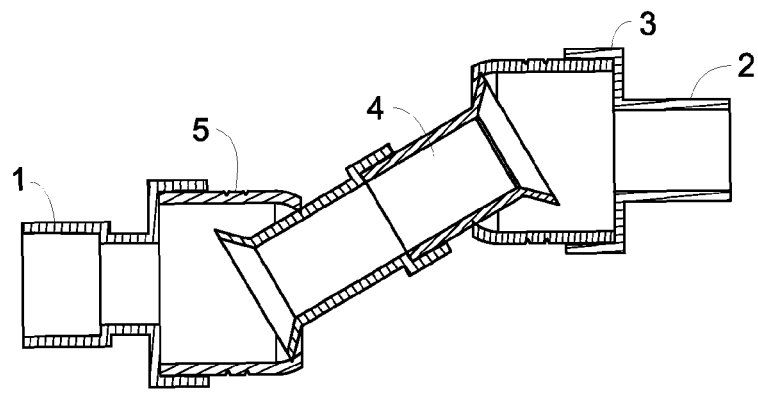
FIG. 4B is a cross sectional view of the claimed device without an outer jacket as viewed along line 4B-4B of FIG. 4A.
Figure 4C:
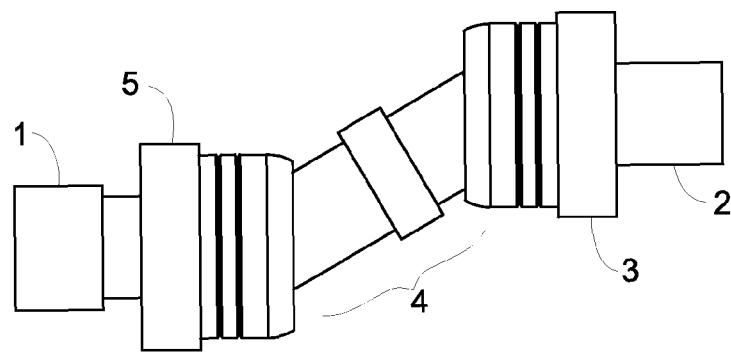
FIG. 4C is another view of the claimed device without an outer jacket.

As can be appreciated in FIGS. 4A-4C, the device can expand and/or deflect at an angle from the axis of the ends 1,2 as needed. FIGS. 4A-4C depict the embodiment of the invention shown in FIGS. 1 and 2 deflected along the axis of the ends 1,2, such that the plane of a conduit (not shown)

joined at the male end 2 is elevated above the plane of a conduit (not shown) joined at the coupling end 1. As shown in FIG. 4B, the inner sleeve 4 may be constructed by connecting or fixing two non-metallic rigid conduit pieces together to form one solid piece. As can be seen from FIG. 4B, the inner sleeve 4 has an inner diameter large enough for the device to accommodate the wires that pass through it because the inner diameter of inner sleeve 4 is at least as large as the smallest inner diameter of the ends 1,2 and adapter sub-assemblies 3,5. The diameter of the inner sleeve 4 is larger at the ends than in the middle of the inner sleeve 4. At the male end 2 of the coupling, the larger end of the inner sleeve 4 is housed within male end adapter sub-assembly 3. At the coupling end 1 of the device, the larger end of the inner sleeve 4 is housed within coupling end adapter sub-assembly 5. As can be appreciated from FIG. 4B, the male end adapter sub-assembly 3 and coupling end adapter sub-assembly 5 partially surrounds the larger end of inner sleeve 4. The inner sleeve end diameter of the male end adapter sub-assembly 3 and the coupling end adapter sub-assembly 5 is larger than the diameter of inner sleeve 4, but smaller than the larger end of inner sleeve 4. As a result, inner sleeve 4 can move axially relative to the male end 2 and coupling end of the coupling, or it can pivot within male end adapter sub-assembly 3 and/or coupling end adapter sub-assembly 5, as shown in FIG. 4B. The inner surface of the male end adapter sub-assembly 3 and coupling end adapter sub-assembly 5 may be a curved surface.

An inner sleeve 4 is located between the coupling end 1 and the male end 2 of the device. As can be seen from FIG. 3B, the inner sleeve 4 has an inner diameter large enough for the conduit to accommodate the wires that pass through it. The diameter of the inner sleeve 4 is larger at the ends (e.g., 4a & 4b) than in the middle 4e,4f of the inner sleeve 4. At the male end 2 of the coupling, the larger end 4a of the inner sleeve 4 is housed within male end adapter sub-assembly 3. As can be appreciated from FIG. 3, this male end adapter sub-assembly 3 partially surrounds the larger end 4a of inner sleeve 4. The diameter of male end adapter sub-assembly 3 is larger than the diameter of inner sleeve 4, but smaller than the larger end 4a of inner sleeve 4. As a result, inner sleeve 4 can move axially relative to the male end 2 of the coupling, or it can pivot within male end adapter sub-assembly 3. The inner surface 3a of the male end adapter sub-assembly 3 may be a curved surface. The male end 2 of the inner sleeve 4 (4a) may also have a surface 4c that is curved inward toward the axis of the inner sleeve 4. The angle of curvature of each of the two curved surfaces 3a & 4c is selected so that contact between the edge of the inner sleeve 4 and the inner surface 3a of the male end adapter sub-assembly 3 is minimized. The elliptical curvature, when viewed in a two-dimensional cross-section view as depicted in FIG. 3B, of the two surfaces 3a & 4c allows the coupling to accommodate greater angular movement of the inner sleeve 4 relative to the conduit even as the coupling is simultaneously accommodating axial movement of the conduits.

A similar range of motion exists between the inner sleeve 4 and the coupling end 1 of the device. At the coupling end 1 of the device, the larger end 4b of inner sleeve 4 is housed within coupling end adapter sub-assembly 5. As can be appreciated from FIG. 3B, this coupling end adapter sub-assembly 5 partially surrounds the larger end 4b of inner sleeve 4. The diameter of coupling end adapter sub-assembly 5 is larger than the diameter of inner sleeve 4, but smaller than the larger end 4b of inner sleeve 4. As a result, inner sleeve 4 can move axially relative to the coupling end 1 of the coupling, or it can pivot within coupling end adapter sub-assembly 5. The inner surface 5a of the coupling end adapter sub-assembly 5 may also be a curved surface. The coupling end 1 of the inner sleeve 4 (4b) may also have a surface 4d that is curved inward toward the axis of the inner sleeve 4. The angle of curvature of each of the two curved surfaces 5a & 4d is selected so that contact between the edge of the inner sleeve 4 and the inner surface 5a of the coupling end adapter sub-assembly 5 is minimized The elliptical curvature, when viewed in a two-dimensional cross-section view as depicted in FIG. 3B, of the two surfaces 5a & 4d allows the coupling to accommodate greater angular movement of the inner sleeve 4 relative to the conduit even as the coupling is simultaneously accommodating axial movement of the conduits.

In one embodiment, inner sleeve 4 may be one solid piece, as depicted in FIGS. 1 and 2. In another embodiment, multiple inner sleeves 4 may be joined together using one or more center joint 7, as depicted in FIG. 3. Center joint 7 allows an even larger range of motion, both in an axial direction and angularly. As can be seen from FIG. 3B, center joint 7 has a convex inner surface such that the larger ends 4g,4h of inner sleeve 4 are trapped within it due to the smaller diameter at the outer surface of the center joint 7 relative to the middle of center joint 7.

As can be appreciated from FIG. 3B, in a preferred embodiment, the inner surfaces of the inner sleeve 4 are smooth and void of sharp edges. The smooth surface prevents the wires from being pinched as the coupling flexes and moves to accommodate the stresses of its environment. The smoother inner surfaces also allow the wires to move within the coupling without becoming snagged or restricted by an interior edge.

The disclosed coupling has a significantly greater range of motion in both the axial and angular directions compared to other known coupling devices. As a result, the device can be used where axial expansion or contraction is anticipated, where there is angular movement between conduits, or where there is parallel deflection between the conduits. It should be appreciated that the inner diameter of the disclosed coupling does not decrease as the coupling moves. The wires, therefore, do not get pinched as the coupling moves.

Due to the modular construction of the device, multiple couplings may be directly attached to each other to achieve an even greater range of motion. To connect one coupling to another, the male end 2 of one device is inserted into coupling end 1 of a second device. The modular construction of the couplings allows the wires that pass through it to be protected as the building, bridge, or other structure moves in any direction and over any distance. It should be appreciated that the modular construction further allows the device to simultaneously accommodate movement in the axial direction and angularly from any direction, not just one fixed direction.

In one embodiment, as shown in FIGS. 3A and 3B, the disclosed device may additionally include a boot or jacket 9 that surrounds the hubs at both ends of the coupling. The boot 9 may be made of rubber or neoprene, or any other flexible material that can be used to create a water-tight seal. The boot 9 may be secured to the exterior surfaces of the coupling end adapter sub-assembly 5 and the male end adapter sub-assembly 3 by use of jacket strap 8, preferably a stainless steel tamperproof strap or plastic ties, such as TY-RAP brand cable ties or CATAMOUNT brand cable ties. Although the boot 9 does limit the degree of movement in a wet environment, the boot 9 allows the inner mechanisms of the conduit and the electrical wiring to remain dry.

Figure 5A:
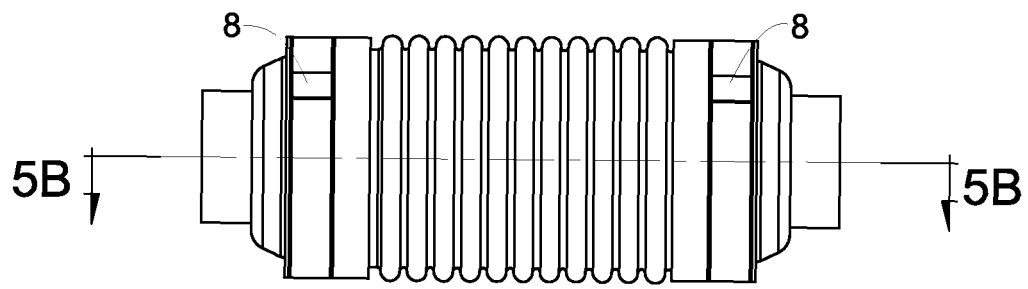
FIG. 5A depicts an elevation view of another embodiment of the claimed device with an outer jacket.
Figure 5B:
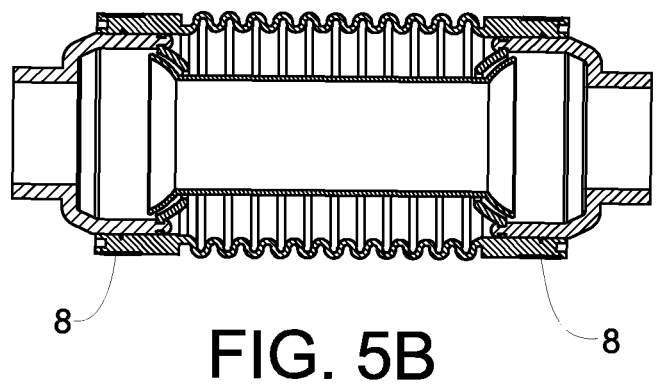
FIG. 5B is a cross sectional view of the claimed device with an outer jacket as viewed along line 5B-5B of FIG. 5A.
Figure 5C:
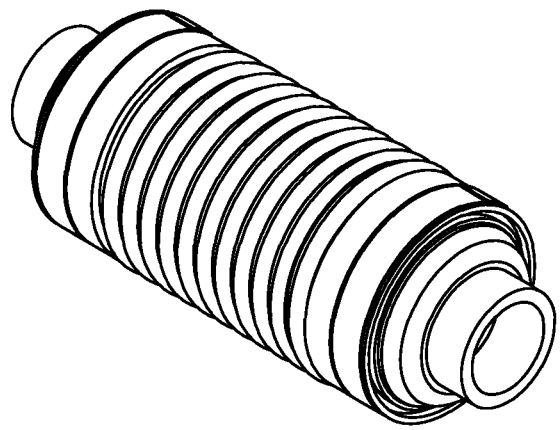
FIG. 5C depicts a perspective view of an embodiment of the claimed device with an outer jacket.

In some embodiments, as shown in FIGS. 5A, 5B, and 5C, the disclosed device may include a boot or jacket that surrounds the hubs at both ends of the coupling. The boot may be made of rubber or neoprene, or any other flexible material that can be used to create a water-tight seal. The boot may be secured to the exterior surfaces of the end bodies by use of jacket strap 8, preferably a stainless steel tamperproof strap or plastic ties, such as TY-RAP brand cable ties or CATAMOUNT brand cable ties. Although the boot does limit the degree of movement in a wet environment, the boot allows the inner mechanisms of the conduit and the electrical wiring to remain dry.

As shown in FIG. 5B, the inner sleeve may be constructed of a single piece non-metallic rigid material. As can be seen from FIG. 5B, the inner sleeve has an inner diameter large enough for the coupling to accommodate the wires that pass through it because the inner diameter of inner sleeve is at least as large as the smallest inner diameter of the male ends. The diameter of the inner sleeve is larger at the ends than in the middle of the inner sleeve. At each male end of the coupling, the larger end of the inner sleeve is housed within or at least partially within the ends. As can be appreciated from FIG. 5B, an annular member is seated in an annular groove of the interior surface of each male end and partially surrounds the larger, flared end of inner sleeve to comprise the end adapter sub-assembly with the male end. The diameter of the annular member is larger than the diameter of inner sleeve, but smaller than the larger, flared end of inner sleeve. As a result, inner sleeve can move axially relative to the ends of the coupling, or it can pivot within the end adapter sub-assemblies. The flared ends of the inner sleeve may also have a surface that is curved inward toward the axis of the inner sleeve.

The disclosed device is preferably constructed of a molded ABS plastic or PVC. If the inner sleeve 4 is one solid piece, it may be formed from a tubular piece of plastic that has been heated and placed over a mold to form the larger ends, e.g., 4a, 4g. Alternatively, it may be made from two half pieces of molded plastic that are fused together with heat or an adhesive. If the inner sleeve 4 is constructed of two or more pieces joined together at a center joint 7, the center joint 7 would be made from two separate portions of molded plastic that are fused together around the larger end (4g, 4h) of the inner sleeve 4.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

I claim:

1. A device for coupling a first conduit and a second conduit comprising:
   a. a male end configured to be inserted into the coupling of said first conduit at a first end, and a second end capable of forming a first joint with an inner sleeve;
   b. a coupling end configured to receive said second conduit at a first end, and a second end capable of forming a second joint with said inner sleeve; and
   c. at least two joints each capable of permitting movement in an axial direction and at an angle relative to each conduit, wherein each of said at least two joints has an inner surface and a longitudinal axis, and wherein each of said inner surfaces are curved inwardly with an elliptical curvature when viewed in a cross-section down the longitudinal axis of said at least two joints at said second ends of said male end and said female end toward the longitudinal axis of said at least two joints, wherein said inner sleeve has a first flared, elliptical-shaped terminal end on a first side and a second flared, elliptical-shaped terminal end on a second side when viewed in the cross-section down the longitudinal axis of said at least two joints, wherein said inner sleeve is disposed between said first joint and said second joint such that said first side is partially disposed within said first joint and said second side is partially disposed within said second joint, and wherein said elliptical curvature at said second ends of each of said male end and said female end are configured to engage the respective said first flared, elliptical-shaped terminal end and said second flared, elliptical-shaped terminal end when said device is in a state consisting of being expanded, being deflected, and a combination of being expanded and deflected.

2. The device of claim 1 further comprising a jacket for preventing intrusion of liquids into said device.

3. The device of claim 1 wherein said first conduit and said second conduit are rigid non-metal conduits.

4. The device of claim 1 further comprising at least a third joint comprising a center joint situated between the male end and coupling end and capable of permitting movement in an axial direction and at an angle relative to each conduit, wherein said inner sleeve is two inner sleeves each having a first flared, elliptical-shaped end and a second flared end, and wherein said center joint is disposed around said second flared ends.

5. A device for coupling a first conduit and a second conduit comprising:
 a. a first male end configured to be inserted into the coupling of said first conduit at a first end, and a second end capable of forming a first joint with an inner sleeve;
 b. a second male end configured to be inserted into the coupling of said second conduit at a first end, and a second end capable of forming a second joint with said inner sleeve; and
 c. at least two joints each capable of permitting movement in an axial direction and at an angle relative to each conduit, wherein each of said at least two joints has an inner surface and a longitudinal axis, and wherein each of said inner surfaces are curved inwardly with an elliptical curvature when viewed in a cross-section down the longitudinal axis of said at least two joints at said second ends of said first male end and said second male end toward the longitudinal axis of said at least two joints, wherein said inner sleeve has a first flared, elliptical-shaped terminal end on a first side and a second flared, elliptical-shaped terminal end on a second side when viewed in the cross-section down the longitudinal axis of said at least two joints, wherein said inner sleeve is disposed between said first joint and said second joint such that said first side is partially disposed within said first joint and said second side is partially disposed within said second joint, and wherein said elliptical curvature at said second ends of each of said first male end and said second male end are configured to engage the respective said first flared, elliptical-shaped terminal end and said second flared, elliptical-shaped terminal end when said device is in a state consisting of being expanded, being deflected, and a combination of being expanded and deflected.

6. The device of claim 5 further comprising a jacket for preventing intrusion of liquids into said device.

7. The device of claim 5 wherein said first conduit and said second conduit are rigid non-metal conduits.

8. The device of claim 5 further comprising at least a third joint comprising a center joint situated between the first male end and second male end and capable of permitting movement in an axial direction and at an angle relative to each conduit, wherein said inner sleeve is two inner sleeves each having a first flared elliptical-shaped end and a second flared end, and wherein said center joint is disposed around said second flared ends.

9. A device for coupling a first conduit and a second conduit comprising:
 a. a first coupling end configured to receive said first conduit at a first end, and a second end capable of forming a first joint with an inner sleeve;
 b. a second coupling end configured to receive said second conduit at a first end, and a second end capable of forming a second joint with said inner sleeve; and
 c. at least two joints each capable of permitting movement in an axial direction and at an angle relative to each conduit, wherein each of said at least two joints has an inner surface and a longitudinal axis, and wherein each of said inner surfaces are curved inwardly with an elliptical curvature when viewed in a cross-section down the longitudinal axis of said at least two joints at said second ends of said first coupling end and said second coupling end toward the longitudinal axis of said at least two joints, wherein said inner sleeve has a first flared, elliptical-shaped terminal end on a first side and a second flared, elliptical-shaped terminal end on a second side when viewed in the cross-section down the longitudinal axis of said at least two joints, wherein said inner sleeve is disposed between said first joint and said second joint such that said first side is partially disposed within said first joint and said second side is partially disposed within said second joint, and wherein said elliptical curvature at said second ends of each of said first coupling end and said second coupling end are configured to engage the respective said first flared, elliptical-shaped terminal end and said second flared, elliptical-shaped terminal end when said device is in a state consisting of being expanded, being deflected, and a combination of being expanded and deflected.

10. The device of claim 9 further comprising a jacket for preventing intrusion of liquids into said device.

11. The device of claim 9 wherein said first conduit and said second conduit are rigid non-metal conduits.

12. The device of claim 9 further comprising at least a third joint comprising a center joint situated between the first coupling end and second coupling end and capable of permitting movement in an axial direction and at an angle relative to each conduit, wherein said inner sleeve is two inner sleeves each having a first flared, elliptical-shaped end and a second flared end, and wherein said center joint is disposed around said second flared ends.

\* \* \* \* \*